Sept. 7, 1948.  W. H. D'ARDENNE  2,448,962
ROCKET STOP ASSEMBLY
Filed Sept. 25, 1946  2 Sheets-Sheet 1
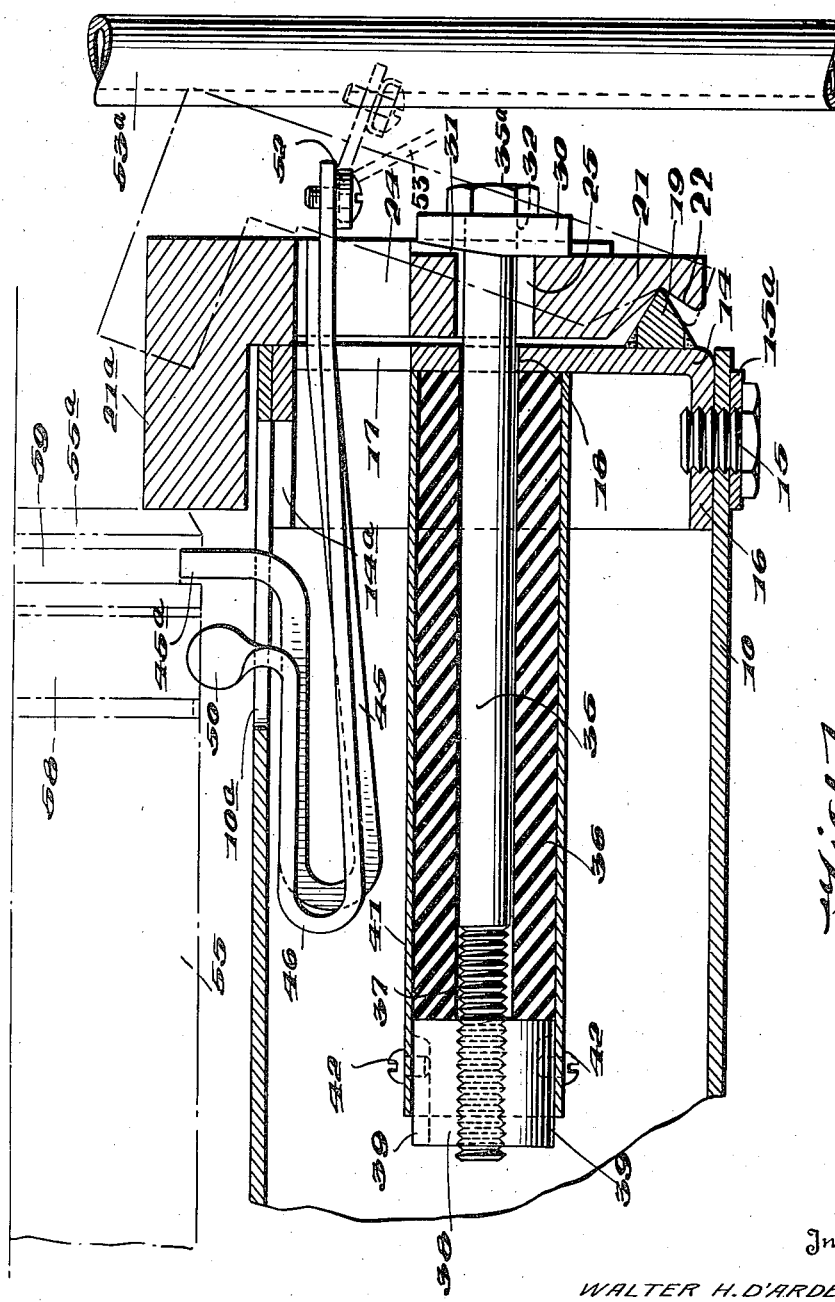
Inventor
WALTER H. D'ARDENNE,
By Robert B. Larson
Attorney

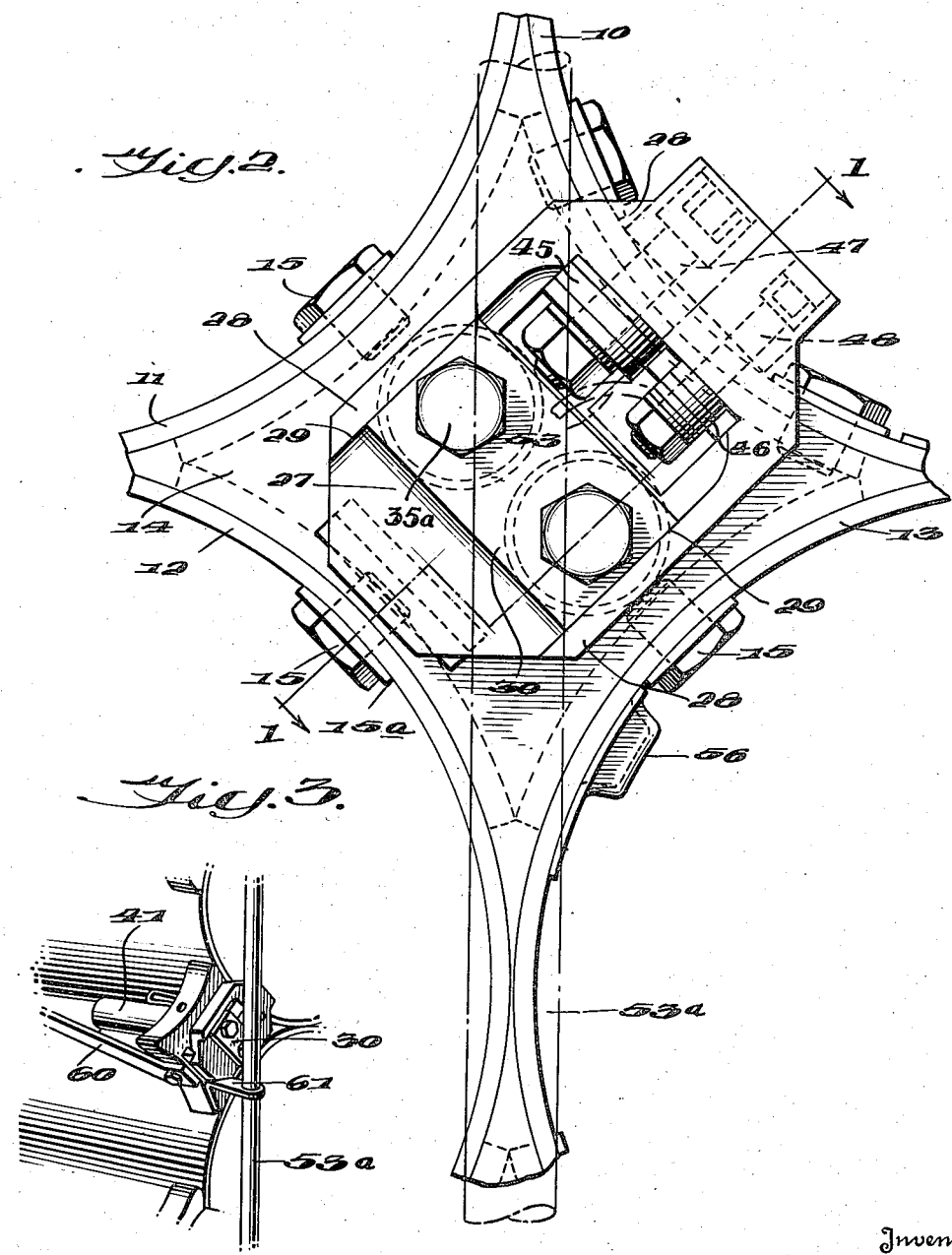

Patented Sept. 7, 1948

2,448,962

UNITED STATES PATENT OFFICE 2,448,962

ROCKET STOP ASSEMBLY

Walter H. D'Ardenne, Jenkintown Manor, Pa., assignor to Heintz Manufacturing Company, Philadelphia, Pa., a corporation of Pennsylvania Application September 25, 1946, Serial No. 699,298

14 Claims. (Cl. 89—1.7)

This invention relates to rocket launchers, and more particularly to a novel rocket stop assembly for use with rocket launchers of the muzzle loading type.

In loading rocket launchers, the rocket is commonly loaded base first into the muzzle of the weapon. When firing at high angles of elevation, it is of course desirable to be able to reload the launcher at the firing angle without depressing the weapon to a loading position, for such changes in elevation take time and necessitate resighting the gun after reloading. Such delay naturally decreases the rate of fire.

In attempting to load launchers at high angles of elevation, difficulty has been experienced in stopping the rearwardly moving rocket round and positioning it correctly for firing, particularly in the case of larger caliber rockets where the mass of the round is considerable.

Accordingly, a primary object of this invention is to provide a rocket stop assembly for rocket launchers which overcomes the above described difficulties.

Another object of the invention is to provide a rocket stop assembly which in addition to receiving and absorbing the impact of the rocket sliding rearwardly in the launcher tube also serves to move the round to the firing position.

A further object is to provide a rocket launcher buffer assembly which carries an electrical contact which is utilized in firing the rocket.

Still another object of the invention is to provide a rocket launcher buffer assembly which may be mounted on a multiple tube type launcher with a minimum of tube modification, the buffer assembly being conveniently mounted, in a preferred embodiment on a filler element which is used in assembling and nesting the tubes, and which retains the tubes firmly in their assembled relation.

A further object is to provide a rocket stop assembly which as a single unit absorbs the shock of the rearwardly moving rocket loaded into the muzzle of the tube, secures the rocket in a firing position, and makes electrical contact with the rocket.

Another object is to provide a rocket stop assembly of the type referred to above which is simple to manufacture and repair and which is adapted to mass production.

These and other objects of the invention will be apparent from the following specification and the accompanying drawing, in which, Fig. 1 is a longitudinal sectional view taken on line 1—1 of Fig. 2 and showing a preferred embodiment with the rocket stop member shown in its rearward position in broken lines and showing the resilient firing contact in its normal unloaded position;

Fig. 2 is a rear elevational view of the assembly shown in Fig. 1 but with the tubular wire conduit shown in broken lines; and Fig. 3 is a perspective view showing the mounting of a filler and its rocket stop assembly on an outer tube of a multiple tube assembly.

In the preferred embodiment of the invention shown in the drawings, four launcher tubes 10, 11, 12, 13 of a multiple tube rocket launcher assembly are assembled at their rear ends to a filler 14 by means of bolts 15 passing from the interiors of the tubes through lock washers 15a and into threaded openings in the flanged sides 16 of the filler. From Fig. 2 it will be clear that launcher tube 10 is fastened to filler 14 by means of two spaced bolts 15 while the other launcher tubes are fastened by a single centrally located bolt 15.

Filler 14 is diamond shaped to fit into the opening formed by the junction of the four launcher tubes and has a rectangular opening 17 near one edge and two circular openings 18 symmetrically located approximately on that center line of the filler which is parallel to the longer dimension of opening 17. A knife edge fulcrum 19 is welded to the rear surface of filler 14 near the edge opposite opening 17, that is, near the edge which contacts launcher tube 12. Openings 17 and 18 and knife edge fulcrum 19 serve purposes which will be described presently.

As shown in Fig. 1, an opening 10a is provided in the wall of tube 10 near its rear end adjacent to filler 14 and a portion of upper flange 16 of filler 14 adjacent tube 10 and opening 10a is cut away at 14a for a purpose which will be clarified presently.

An important part of the assembly is the L-shaped stop member 21 which, as shown, is block-like and has a transversely extending depression 22 near one end adapted to engage knife edge 19. The angle between the sides of depression 22 is considerably greater than the angle between the sides of knife edge 19 so as to permit pivoting of stop 21 about the knife edge. Stop 21 also has an opening 24 and two circular holes 25 positioned so as to be aligned with openings 17 and 18 when stop 21 is in its normal position (solid line position in Fig. 1) with its short portion 21a extending into the interior of launcher tube 10 from the rear end thereof.

The rear surface of stop member 21 is formed with a central depression 27 which is surrounded on three sides by a raised portion 28. Slidably mounted between parallel edges 29 of the raised portion is a small bearing washer plate 30 having a beveled inner portion 31 and provided with a pair of symmetrically positioned holes 32 located so as normally to be axially aligned with holes 25. Holes 32 receive a pair of elongated highly tensile bolts 35 whose heads 35a lie against the rear surface of washer plate 30 while the shanks of the bolts extend forwardly through holes 25, through openings 18 in filler 14 and through a thick walled tubular shock absorber 36 of rubber or other similar material. The threaded forward ends 37 of bolts 35 screw into cylindrical nuts 38 which have diametrically opposed longitudinal grooves 39 for a purpose which will be clarified presently.

The tubular rubber shock absorbers 36 are housed within high tensile strength steel cylinders 41 whose rear ends rest against the forward surface of filler 14, and which are provided with diametrically opposed screw holes which threadedly receive screws 42 whose end portions extend into the interiors of cylinders 41 and engage grooves 39 of nuts 38 as best shown in Fig. 1.

A latch spring 45 and a firing contact spring 46 extend rearwardly through opening 17 in filler 14 and into opening 24 in stop 21. Both members 45 and 46 are fixed to the stop member 21 by means of bolts 47 and 48 which extend through countersunk holes opening into the interior of launcher tube 10 and into the interior of opening 24. Members 45 and 46 are appropriately positioned by means of washers surrounding bolts 47 and 48, the mounting of firing contact spring 46 being such as to insulate the contact from the stop member. The forward ends of spring members 45 and 46 extend through opening 10a and 14a into the interior of launcher tube 10.

Firing contact spring 46 comprises a flat piece of spring steel extending forwardly from its point of fixation to stop 21, and then bent back upon itself at its forwardmost portion and finally bent upwardly at a right angle. The very end portion 50 of contact 46 is twisted through 90 degrees, rounded and sharpened to form a knife edge contact.

At its rear end, the contact spring 46 extends some distance beyond the rear surface of stop 21 and in its rearmost portion carries a screw-mounted cup washer 52 having a cut-away wall portion which is adapted to receive the end of a firing wire 53 (Fig. 2) beneath the head of screw 52a which passes through the washer. The wire 53 extends from an opening in the side wall of a protecting tube 53a which shields the wire from the rocket blast during firing and conveys the wire to a point (not shown) where it connects with conventional elements of an electrical rocket firing circuit. Wire 53 is omitted from Fig. 1 for purposes of clarity. As this circuit comprises no part of the present invention it need not be described further here.

Latch spring 45 is also resilient and is quite similar in general shape to contact 46 except that it does not extend past the rear surface of stop 21. At its inner end 45a, spring 45 is hollowed out when viewed in rear elevation to conform substantially to the curve of the outer peripheries of rockets 55 which are used with the launcher. The end surface of spring 45 may advantageously be ground off at a slight angle forwardly to assist the rear end of the rocket in riding up over the end of the spring when the rocket is loaded into the tube. The utility of the latch spring will be explained presently.

Rockets 55 which are used with the launcher of which the novel assembly is a part are of the conventional spin stabilized type in which a rocket propellant is ignited by an electrically operable squib (not shown) when a firing circuit is closed. One end of the squib is grounded through the body of the rocket to the launcher itself by means of launcher guide rails 56 in the tube (Fig. 2). For convenience, only one of the guide rails 56 is shown, the guide rails being of the conventional type comprising bent pieces of sheet metal welded to the inner surface of the launcher tubes and spaced usually 120 degrees apart about the inner periphery of each tube.

Each rocket 55 is beveled at 55a at its rear end and has a conducting band portion 58 near its rear end insulated from the rest of the rocket and connected to the ungrounded end of the squib. It is this band portion 58 which is adapted to be contacted by the sharp end of spring firing contact 46 to connect the rocket with the firing circuit (not shown). The resiliency of the spring contact member 46 assures a good electrical connection between the contact 46 and contact ring 58.

The rearmost portion of the rocket is provided with an annular groove 59 which is adapted to receive the end of latch spring 45 as shown in Fig. 1. When the rocket is slid into the muzzle of the launching tube, its rearward motion carries its rear end over the end of spring latch 45 which snaps into groove 59 and assures the accurate relative positioning of rocket 55 and contact spring 45 by preventing the rocket from rebounding off the stop member to a position too far forward to permit engagement of contact 46 and conducting ring 58. The beveled rear end portion 55a of the rocket and the beveled tip end of spring latch 45 cooperate to facilitate the movement of the rear end of the rocket over the end of spring latch 45.

*Operation*

When a rocket 55 is dropped into the forward or muzzle end of a launcher tube such as tube 10, the rocket strikes stop member 21 and moves the stop 21 rearwardly about its knife edge pivot 19 to the broken line position in Fig. 1. The end of latch spring 45 snaps into groove 59 in the rocket and automatically positions the rocket so that contact band 58 and contact spring 46 are correctly positioned for good firing contact.

The rearward movement of stop member 21 moves washer 30 rearwardly and exerts a rearward pull on the two bolts 35 connected with bearing washer 30 which slides in the groove in the rear face of stop 31 formed by raised side portions 28. As stop 21 rocks backwardly, the beveled portion 31 of washer 30 receives an increasing amount of the pressure from stop member 21. The two rubber shock absorbers are compressed in a horizontal and then in a vertical direction against the walls of cylinders 41 putting the cylinders in tension. The shock absorbers then return stop member 21 to its original position with the base of the rocket resting against the forward surface of portion 21a of the stop, with latch 45 engaged in groove 59 in the rocket, and with the knife edge end of contact 46 pressed tightly against the surface of contact band 58 on the rocket. Contact 46 will then be depressed slightly below the position in which it is shown in Figure 1 due to the pressure of the rocket on its knife edge.

Rubber shock absorbers 36 thus take the initial shock absorption and the high tensile cylinders 41 take the more intensive absorption. The highly tensile steel bolts 35 also take some of the shock. These bolts may be screwed in or out to meet the requirements of the load to be absorbed.

It will be clear from a study of the structure that the insulated spring contact 46 and latch spring 45 may be removed separately by removal of screws 48 and 47 without removing the entire stop assembly from the launcher.

By attaching both latch 45 and contact 46 to stop 21, their correct relative positioning is assured, this being important in assuring contact of the insulated band 58 on the rocket with knife edge 50 of contact 46.

It should perhaps be pointed out that all of the launcher tubes of the assembly are identical and that the lower left hand rear portion of each tube 11, 12, 13, as well as each of the other tubes of the assembly, has one of the stop assemblies described in detail above. In the case of the left hand outer tubes, an arrangement such as shown in perspective in Fig. 3 is used. In this arrangement, the very same filler and stop assembly is used as is shown in Figs. 1 and 2 with the exception that there are no tubes in the positions which are occupied by tubes 11 and 12. Instead, a brace 60 is bolted to the upper right hand tube and to the filler member. Fig. 3 also shows brace 61 which is attached to the lower rear corner of the filler and which assists in supporting tube 53a which encloses the wiring of the device.

In the case of the lower left hand corner tube, the filler will be supported only by its attachment to the corner tube and by a brace similar to brace 60.

I wish it to be understood that the device described and illustrated herein is only a preferred form of the invention and that I am fully cognizant of the fact that the invention is susceptible of numerous modifications. It is my intention to cover by this patent all such modifications falling within the scope of the invention as defined by the appended claims.

I claim:

1. A rocket stop assembly for muzzle loading electrically fired rocket launchers comprising a resiliently mounted rocket stop member adapted to be positioned near the rear end of the launcher, and means mounted on said member for making electrical firing contact with a rocket in firing position in said launcher.

2. A rocket stop assembly for muzzle loading rocket launchers comprising a stop member having a normal position defining the firing position of a rocket and adapted to be moved from said normal position by a rocket moving rearwardly in the launcher, means for returning the stop member to its normal position after the rearward movement of the rocket has been halted, and means attached to the stop member and engageable with a portion of the rocket for retaining the rocket in its firing position after return of the stop member to said normal position.

3. A rocket stop assembly as set forth in claim 2 in which an electrical firing contact is also attached to said stop member, the correct relative positioning of said firing contact and said means for retaining the rocket in its firing position being assured by their both being attached to the stop member.

4. A rocket stop assembly for muzzle loading rocket launchers comprising an L-shaped block mounted on the rear end of said launcher with its longer arm disposed transversely to the firing axis of the launcher and with its shorter arm extending into the rear end of the launcher to be engaged by a rocket loaded into the muzzle of the launcher and moving rearwardly in the launcher, and means for resiliently resisting rearward movement of said block under the impetus of the rearwardly moving rocket.

5. In a muzzle loading rocket launcher, a rocket stop assembly comprising a stop member mounted on the rear end of the launcher and positioned to be engaged by a rocket loaded into the muzzle of the launcher and moving rearwardly in the launcher, and means for resiliently resisting rearward movement of said stop member under the impetus of the rearwardly moving rocket, said means comprising at least one resilient shock absorbing member having one end bearing against a stationary part of the launcher, and means for transmitting to the other end of said resilient member forces tending to move said stop member rearwardly.

6. In a muzzle loading rocket launcher, a rocket stop assembly comprising a stop member mounted on the rear end of the launcher and positioned to be engaged by a rocket loaded into the muzzle of the launcher and moving rearwardly in the launcher, and means for resiliently resisting rearward movement of said stop member under the impetus of the rearwardly moving rocket, said means comprising at least one cylindrical member having its rear end bearing against a stationary part of the launcher, a tubular member of resilient plastic material within said cylindrical member, a follower within the forward end portion of said cylindrical member and bearing against the forward end of said tubular plastic member, and a connecting element passing through said tubular resilient member, said connecting element engaging said follower at its forward end and being associated with said stop member at its rear end, whereby said connecting element transmits to said tubular resilient member and to said cylindrical member by means of said follower forces tending to move said stop member rearwardly.

7. A rocket stop assembly for muzzle rocket launchers comprising a stop member adapted to be pivotally mounted on a stationary part at the rear end of the launcher so as to be engaged by a rocket loaded into the muzzle of the launcher and moving rearwardly in the launcher, said stop member having a depression in its rear surface, a washer element slidably mounted in said depression, at least one cylindrical member having its rear end bearing against a stationary part of the launcher, a tubular member of resilient plastic material within said cylindrical member, a follower within the forward end portion of said cylindrical member and bearing against the forward end of said tubular plastic member, and a connecting element passing through said tubular resilient member, said connecting element engaging said follower at its forward end and being associated with said washer element at its rear end, whereby the force of the rearward movement of the rocket loaded into the muzzle of the launcher is absorbed by said tubular resilient member and by said cylindrical member.

8. A rocket stop assembly for muzzle loading rocket launchers of the type which fire a rocket having an electrical contact and a positioning groove near its base end, comprising a resiliently mounted stop member positioned at the rear end of said launcher so as to be engaged by the rocket moving rearwardly in the launcher after being loaded into the muzzle end thereof and so as to absorb the force of said movement, a resilient electrical firing contact mounted on said stop member and extending into said launcher for contacting said rocket carried firing contact, and a resilient latch member mounted on said stop member and extending into said launcher for engaging said positioning groove to assure proper positioning of said rocket in the launcher after said stop member has stopped the rearward movement of the rocket.

9. A rocket stop assembly as set forth in claim 8 in which said stop member is L-shaped and is positioned with its longer arm disposed transversely to the firing axis of the launcher and with its shorter arm extending into the rear end of the launcher to engage the rocket.

10. A rocket stop assembly as set forth in claim 8 in which there is provided a knife edge pivot extending rearwardly from a stationary part of the launcher, and a notch in said stop member engaging said knife edge, whereby said stop member is pivotable about said knife edge.

11. A rocket stop assembly for muzzle loading rocket launchers of the type which fire electrically fired rockets, comprising a stop member movably mounted on the rear end of said launcher in the path of rockets loaded into the muzzle of the launcher, buffer means associated with said stop member for absorbing the force of a rocket moving rearwardly in the launcher after being loaded into the muzzle of the launcher, said stop member having an opening therein, a rocket positioning element extending into said opening, a rocket firing contact having its rear end extending into said opening, and means detachably fixing said rocket positioning element and said contact to said stop member.

12. A rocket stop assembly as set forth in claim 11 in which said last named means of claim 11 includes threaded means extending through a portion of said stop member into said opening, said opening being of such size as to permit access to the ends of said fastening means to permit removing said positioning element and said contact without removing said stop member from the launcher.

13. In a muzzle loading rocket launcher of the type having a plurality of nested launching tubes spaced apart by rear filler elements, a plurality of rocket stop assemblies for absorbing the force of said rockets moving rearwardly in the tubes after being loaded into the muzzles of the tubes, there being one of said assemblies for each tube, each stop assembly comprising a knife edge pivot carried by the rear surface of a filler element, a stop member pivotable about said knife edge, and means associated with said stop member for resiliently resisting rearward pivotal movement of said stop member, whereby said last mentioned means absorbs the force of rearward movement of said rockets.

14. A structure as set forth in claim 13 in which said last mentioned means comprises a cylinder positioned forwardly of said filler with its rear end abutting said filler, a resilient plastic tube within said cylinder, and means associated with said stop member for compressing said plastic tube when said stop member is pivoted rearwardly.

WALTER H. D'ARDENNE.

REFERENCES CITED

The following references are of record in the file of this patent:

UNITED STATES PATENTS

| Number | Name | Date |
|---|---|---|
| 197,615 | Dawson | Nov. 27, 1877 |
| 859,607 | Lamure | July 9, 1907 |
| 1,994,322 | O'Neil | Mar. 12, 1935 |
| 2,354,025 | Johnson | July 18, 1944 |